ated: Feb. 23, 1982

United States Patent [19]
McGroarty

[11] 4,316,833
[45] Feb. 23, 1982

[54] WATERPROOFING MATERIAL CONTAINING BENTONITE

[76] Inventor: Bryan M. McGroarty, 10233 Chicago Cir., Bloomington, Minn. 55420

[21] Appl. No.: 91,599

[22] Filed: Nov. 5, 1979

Related U.S. Application Data

[63] Continuation-in-part of Ser. No. 897,783, Apr. 19, 1978, abandoned.

[51] Int. Cl.$^3$ .............................................. C08K 5/01
[52] U.S. Cl. .................. 260/33.6 PQ; 260/33.6 UA; 260/42.14; 260/42.57; 260/42.44
[58] Field of Search ............... 106/71, DIG. 4, 193; 252/8.5 C, 8.55 R; 166/295; 260/42.14, 33.6 UA, 33.6 PQ, 42.57

[56] References Cited

U.S. PATENT DOCUMENTS

| | | | |
|---|---|---|---|
| 1,498,269 | 6/1924 | Harris | 106/214 |
| 1,943,584 | 1/1934 | Cross | 252/6 |
| 2,083,961 | 6/1937 | New | 106/86 |
| 2,104,488 | 1/1938 | Kennedy et al. | 166/292 |
| 2,239,126 | 4/1941 | Swenarton | 106/253 |
| 2,248,636 | 7/1941 | Marsden | 428/220 |
| 2,260,882 | 10/1941 | Berg | 134/46 |
| 2,516,342 | 8/1950 | Randall | 106/92 |
| 2,661,298 | 12/1953 | Shanley | 106/38.23 |
| 2,757,737 | 8/1956 | Schremp | 166/295 |
| 2,896,280 | 7/1959 | Ilenda et al. | 22/194 |
| 3,139,412 | 6/1964 | Sterling | 260/33.6 PQ |
| 3,377,298 | 4/1968 | Clermont-Ferrand | 260/8 |
| 3,444,117 | 5/1969 | Higgins | 260/33.6 PQ |
| 3,676,198 | 5/1970 | McGroarty | 427/180 |
| 3,779,782 | 12/1973 | Erickson | 106/72 |
| 3,865,190 | 2/1975 | Christopher | 252/8.55 R |
| 3,897,073 | 7/1975 | Swanson | 277/229 |
| 3,954,629 | 5/1976 | Scheffel | 252/8.5 LC |
| 4,173,999 | 11/1979 | Messenger | 166/293 |

*Primary Examiner*—Allan Lieberman
*Assistant Examiner*—P. Short
*Attorney, Agent, or Firm*—Kinney, Lange, Braddock, Westman and Fairbairn

[57] ABSTRACT

A liquid system containing no water to form an underground waterproof coating material containing a high concentration (70%+) of bentonite (sodium montmorillonite) which is non-hydrated, non-emulsifiable, unexpanded, non-jelled, non-thixotropic but is sufficiently liquid to be applied to a wood, metal or concrete substrate by a caulking gun, trowel or spray method. It can be used over a wide range of temperatures and can be applied to damp surfaces.

10 Claims, 3 Drawing Figures

WATERPROOFING MATERIAL CONTAINING BENTONITE

This is a continuation-in-part of application Ser. No. 897,783, filed Apr. 19, 1978 now abandoned.

BACKGROUND OF THE INVENTION

1. Field of the Invention

The present invention relates to compositions of material using no water with high concentrations of bentonite clay.

2. Prior Art

Various caulking and sealants have been advanced, but none which use bentonite as a primary component. The emulsifying qualities of bentonite, when used in water mixtures, are well known. However, when used in a water mixture, bentonite imparts no waterproofing characteristics and is present to act as a suspending, thickening or dispersing agent.

Applying bentonite with various compositions in a dry spraying method is illustrated in my own U.S. Pat. No. 3,676,198, issued July 11, 1972. In the performance of the method set out in my previous patent, certain liquid compositions are prepared and sprayed from a nozzle toward a wall or surface to be coated. At the same time, unhydrated bentonite is projected toward the wall and the spray is intermixed with the bentonite as it travels to the wall and also in place on the wall surface that is being waterproofed. In that method the bentonite was kept dry to prevent swelling.

Additionally, the American Colloid Company markets a joint seal under the trademark "Volclay" which is apparently a bentonite compound that can be troweled on or used as a lubricant. It apparently utilizes water and a humectant such as glycerin mixed with the bentonite material in expanded form. This is an extremely low concentrate of bentonite and will not provide the heavy duty waterproofing of the present invention.

SUMMARY OF THE INVENTION

The present invention relates to a bentonite based composition for coating walls or sealing joints in concrete, and sealing around pipe openings and the like in building construction. The composition can be used for any type of waterproofing or water stop application if desired.

The material does not become brittle. It contains a high percentage by weight of bentonite clay, preferably of sodium montmorillonite (Wyoming bentonite) mixed with a liquid so that it will have a consistency that is similar to caulking compound. By varying the consistency, it can be made suitable for spray application.

The material can be applied with an ordinary caulking gun, and cures to a semi-hard, resilient material and has enough strength to withstand the rigors of construction practices, but which will swell in well known manner attributed to bentonite repeatedly to provide the waterproofing or waterstop characteristics.

Commercial grade sodium montmorillonite is satisfactory. It is mixed with a non-polar fluidizer, a non-aqueous adhesive and plasticizers (polybutene). If desired, sodium aluminate may be used in trace amounts to coagulate the bentonite slightly to reduce the water permeability and to reduce the possibility of leaching under a constant water flow condition.

Additionally, reinforcing agents such as glass, rayon or nylon fibers may be used for mechanical strength. Other extenders and additives which increase the bonding strength may be utilized to provide a workable material which does not excessively cause swelling of the bentonite with which it is mixed. The composition has mechanical strength and the shelf life necessary for commercial applications.

DESCRIPTION OF THE PREFERRED EMBODIMENT

Figure 1:
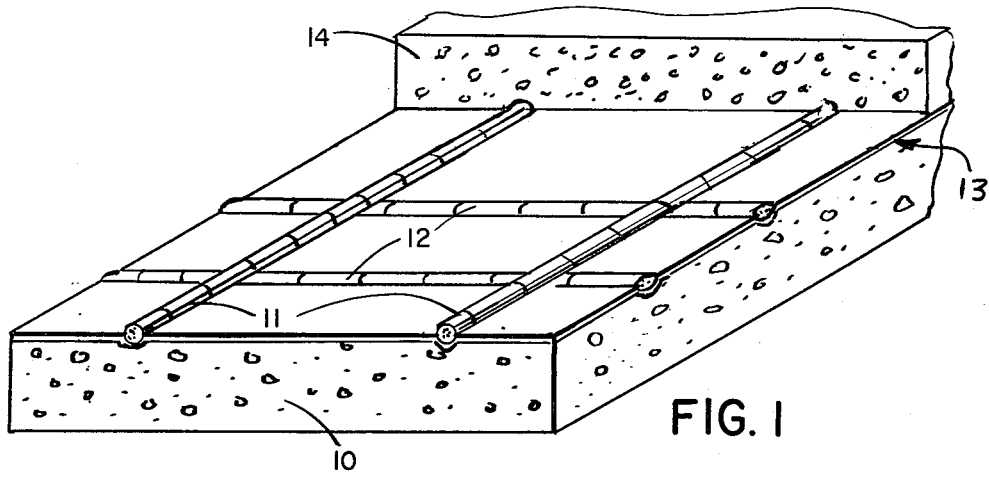
FIG. 1 is a perspective view of a typical under floor installation utilizing the material of the present invention to provide a grid network of water stop beads to isolate leaks in one area.

The present composition comprises a bentonite based compound which can be used to replace butyl or PVC membranes. It comprises a dry granular bentonite mixed with sufficient amount of additional liquid materials to provide a paste type substance which remains semi-fluid at reasonable working temperatures, and has good adherence to concrete or other materials to be sealed. The mixture is such that the bentonite has not swelled, but will permit water to enter the bentonite granules or particles and cause delayed swelling when water comes into contact after the material is in place.

In particular, one preferred embodiment is set forth in Table I below:

TABLE I

| PREFERRED EMBODIMENT | | |
|---|---|---|
| Component | Amount | Brief Description |
| Bentonite (Sodium Montmorillonite) | 100 lbs. | 200-325 U.S. Standard Mesh |
| Non-aqueous Adhesive (Hydrocarbon resins) | 5-10 lbs. | 70-120° C. Softening Point Liquifier and Adhesive |
| Liquid Fluidizer (mineral spirts, etc.) | 20-25 lbs. | Solvent |
| Cab-o-sil (Fumed silica) | 4-12 lbs. | Thickener |
| Bentones | 0-6 lbs. | Thickener |
| Sodium Aluminate | 0-3 lbs. | Coagulant |
| Inert Filler (Glass, non-capillary fiber) | 1-3 lbs. | $\frac{1}{8}''$-$\frac{3}{4}''$ Lengths |

The method of mixing is important if the material of the present invention is to perform properly in use. A mixer is charged with approximately 15 lbs. of non-polar liquid fluidizer or liquifier (mineral spirits). The 100 lbs. of bentonite (200-325 mesh) is added followed by a mixture of non-aqueous adhesive, a plasticizer (polybutene) if desired in 5-10 additional pounds of mineral spirts (about 60%). The initial charge of mineral spirits (80% of the total) is absorbed into the bentonite. The adhesive is thus diluted with 20% of the fluidizer which acts as a solvent. To this mixture, the thickening agents (cab-o-sil, bentone, etc.) are added until the material reaches a consistency which is suitable for its end use (caulk, trowel, spray, etc.). Mixing time ranges from 14 to 20 minutes per batch when using a paddle type low shear mixer. The liquid fluidizer should be a solubilizer for the adhesive, and should be non-toxic. After application the fluidizer evaporates and the mixed materials become tough, elastic and water resistant, but not completely waterproof until jelling of the bentonite occurs.

SUMMARY OF PROPERTIES OF BASIC INGREDIENTS

Sodium montmorillonite is a well known bentonite product, many times called Wyoming type bentonite. Commercial grades that are presently available are of sufficient quality to use in the composition of the present invention, but selected material provides a higher absorption in water and with slightly lower permeability ratings if the higher quality is used. The Wyoming type bentonite is used in its unhydrated or dry form, which is commercially available. The size may be varied, but a 200–325 mesh size material is preferred. A "200 mesh size material" means a material which will pass through a standard screen having 200 openings to the square inch. 200–325 mesh material is very fine and powdery.

Liquid fluidizers comprise material selected from the group comprising liquid $C_6$ to $C_{16}$ aliphatic hydrocarbons and liquid alicyclic hydrocarbons. An aliphatic compound such as mineral spirits or VM & P naphthas are examples. The liquid fluidizer saturates the bentonite in initial mixing and thereby inhibits the adhesive agent from substantially penetrating the bentonite particles subsequent to the initial mixing. Also the fluidizer should be a solvent for the adhesive agents and preferably have a flash point between 100° C. and 105° C.

Adhesive agents. The preferred adhesive agent comprises a hydrocarbon resin containing linear, branch and/or cyclic structures of an aliphatic nature. "Aliphatic nature" means that the material retains the essential aliphatic characteristics and includes alicyclics. Polysiobutylene, and natural and synthetic polyterpenes are preferred. The hydrocarbon resins preferably have a softening point between 70° C. and 120° C. and a flash point of 300° F. to 500° F.

After initial mixing, the bentonite particles are saturated with the liquid fluidizer, which can be displaced by water, and which also acts to prevent the adhesive from penetrating the bentonite in the mixture. If the adhesive penetrates the bentonite, it will destroy the ability of the bentonite to swell and thus will destroy its waterproofing capabilities. Thus, the material of the present invention is functional because of the liquid fluidizers which saturate the bentonite and prevent the adhesive agent from penetrating the bentonite, but which may be displaced by water. After application, the fluidizer agents will evaporate and the adhesive will hold the material together. Water can then penetrate to cause swelling of the bentonite and result in the waterproofing action.

Cab-O-Sil is a trademark used with a commercially available fumed silica. It is manufactured by Cabot Corporation, 125 High Street, Boston, Mass. It has the property of providing resistance to abrasion and thickening the non-polar fluidizers.

Referring to FIG. 1 of the drawings, a typical application of the composition of material of the present invention as described is shown. A structural slab 10 may be used as a floor, for example, on a plaza, and beads 11 may be formed generally parallel and spaced apart as shown, and traversed by cross beads 12, to form a grid work across the top of the structural slab that forms support for the floor. Generally, there is a waterproof membrane (plastic sheet) 13 that overlies this slab over the beads 11 and 12, and a topping or floor surface layer indicated at 14 is provided over the waterproof membrane. Usually what happens in a concrete floor is if there is a leak, it can never be isolated because the water will tend to flow or migrate between the waterproof membrane along the structural slab, and leaks will occur at a number of different places on the interior even though only one leak through the waterproof membrane may be present.

By having a grid work of caulking beads across the floor slab migration of water is prevented and the leak will be isolated in one particular grid area making repair much more economical.

Figure 2:
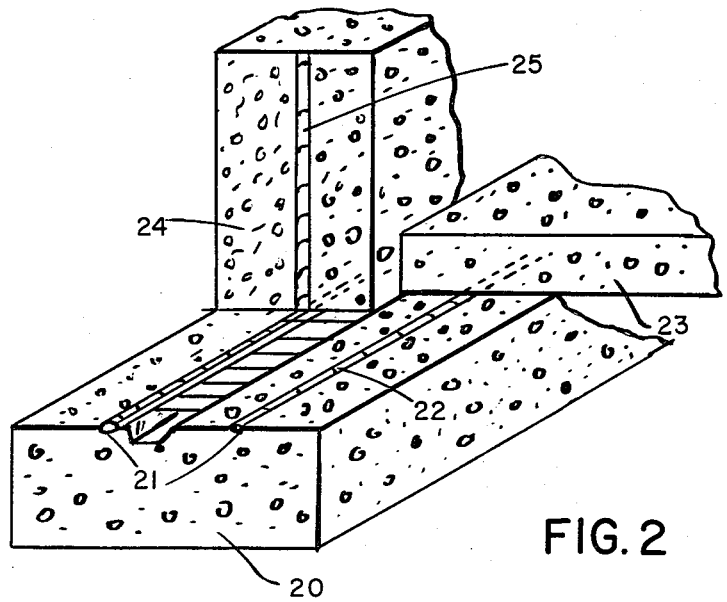
FIG. 2 is a perspective view of a typical footing and wall junction illustrating usage of the material of the present invention to prevent leaks at such a location.

FIG. 2 illustrates a typical footing 20 which has keyways defined therein indicated generally at 21 in which beads of the material of the present invention are laid as indicated at 22. A floor slab 23 may be laid over one of the beads, and a wall 24 poured over the other one of the beads. The beads 22 in place in keyways will expand when in contact with water to prevent such water from intruding from the exterior into the interior floor slab, or from the ground past the floor slab and into the interior of the building. Additionally, poured walls such as that shown at 24 can be keyed, and vertical beads indicated at 25 can be placed in the joint between pours.

Figure 3:
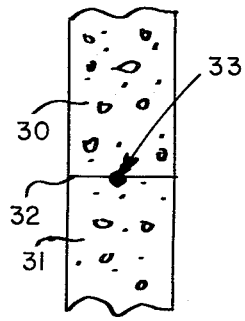
FIG. 3 is a vertical fragmentary sectional view showing the cold junction is poured concrete with the water stop material of the present invention in place.

In FIG. 3 a typical cross section of a vertical cold joint between the poured wall sections is shown. The wall sections indicated at 30 and 31 are upright walls, having a vertical interface or joint 32 therebetween extending in vertical direction. The bead indicated at 33 of the material of the present invention is placed vertically along the interface much the same as shown at 25 in FIG. 2, and provides a barrier to passage of water through the interface surfaces 32 even though the two wall sections 30 and 31 are poured at different times.

Thus it can be seen that the waterstop material must have ability to be formed into a bead or suitable sealing rib or layer, and upon curing, accept water (hydrate) so that the bentonite in the composition will swell in a known manner to cause sealing of any cracks or openings.

To express the primary components in percentage, and in wider ranges, Table II follows:

TABLE II

Ranges stated as percentages of total composition weight, excluding inert fillers.

| COMPONENT | |
|---|---|
| Bentonite (Sodium montmorillonite) (200–325 mesh) | 50–80% |
| Adhesive (hydrocarbon resins) | 5–10% |
| Aliphatic or alicyclic fluidizer (mineral spirits) | 20–25 |
| Cab-O-Sil (fumed silica) (thickener) | 2–7% |
| Bentone (thickener) | 0–6% |
| Sodium Aluminate | 0–.2% |
| Inert fillers | As needed |

Extenders may be added, such as ground silica. The silica would generally be of the same mesh size (pass through U.S. standard 200 mesh, but not pass through 325 mesh) as the bentonite particles themselves, and can be added in substantial quantities, for example, approximately half of the total quantity by weight of the montmorillonite or bentonite, and may be incorporated without adversely affecting the permeability of the material. That is, approximately 50 pounds of silica can be added to the previous mixture based on 100 pounds of montmorillonite. As the percentage of montmorillonite in the total material is reduced, the materials' ability to reseal after extensive movement of the material or of the interfacing surfaces is curtailed because the silica, of course, will not expand as the montmorillonite will, and if too thin a layer is the result of such movement, there will not be sufficient bentonite particles in the layer to expand sufficiently for the water stop action.

Certain instances where the material forming the waterstop composition is to be applied to an already poured concrete structure surface and left exposed to the effects of rain before the second pouring, it can be coated with a solution containing five to ten percent calcium alginate. The calcium alginate will resist the penetration of rain water until such time as the material is again embedded in the alkaline environment of freshly poured concrete.

In other words, in a cold joint environment as shown in FIGS. 2 and 3, if the beads of waterstop material has been left exposed and are coated with calcium alginate, they will not take on free water and will not expand substantially until such time as the calcium alginate has been hydrolyzed under the effects of the alkaline environment of the poured concrete. Once the calcium alginate is hydrolyzed, then the bead material will again act as it did prior to the application of such calcium alginate and will expand and cause sealing.

Where costs become a problem, in place of the relatively high priced sodium aluminate, which is added to the mixture for a coagulant, aluminum sulfate, ferric chloride, and other polymer flocculents can be substituted in trace amounts. These also would be from one-half to one pound per 100 pounds of sodium montmorillonite.

Additionally, chemicals can be utilized for preventing root growth, if desired. Many of these are well known and can be added in small amounts. Generally, only one ounce or so per 100 pounds of montmorillonite of a root penetration preventive is necessary. Suitable root growth preventers are 3 (P-Chlorophenyl)-1, I-dimethylurea, or other urea-borax complexes.

When the material is mixed as outlined in the examples above, it will have a consistency that will allow it to be packaged in a caulking type cartridge or to be drawn out into caulking guns from five gallon containers in the usual manner. The material can be extruded from the cartridge directly on the surface to which it is to be placed, and the bead diameters can range, if necessary, for proper filling and sealing.

For example, in the junction of a floor with a vertical wall, a one-half inch to five-eighths inch diameter bead (or approximately one gallon for 44 lineal feet) would be used. Vertical cold joints require substantially the same size bead, while sealing around insulation requires one-quarter to three-eighths diameter bead (60 to 80 lineal feet per gallon).

When used in cold joints in floors, walls, footings and other poured concrete structures, the material should be allowed to cure or dry between one hour and three hours, depending on the ambient temperature and the relative humidity. After it has dryed or cured sufficiently so that it is held in place, the next concrete pour is made and the bead then is trapped within the joint, as shown in FIGS. 2 and 3. When subsequently subjected to water, the material will expand due to the fact that the bentonite will turn to a jel, as is well known, and will exert approximately a 22 psi internal pressure that pushes the expanding material into the joint until the source pressure is equalized by the resistance to movement of the material forming the bead. In this initial hydration, expansion, flow, and pressure equalization, only a small percentage of the bentonite is actually expanded. Thus, if more water comes in, or if a shearing movement occurs between the pours, the material will quickly reseal any portion that has ruptured. Beads of the material in place will withstand heads of 95 feet of water in test operation.

The material may be premixed to be applied by spraying with spray guns. Water cannot be used as or contained in the liquifier because it will destroy the properties of the system by hydrating the bentonite. The spray application requires a greater liquidity. The liquidity is primarily controlled by amounts of thickener added, such as Cab-O-Sil and bentones. The inert fillers also may be eliminated or reduced for sprays. Conventional guns and techniques may be used for the spraying application.

The material is designed to have extremely low toxicity and is basically non-allergenic. It can be applied over damp surfaces and will adhere at temperatures as low as $-15°$ F. The product will withstand continued hydrostatic pressures equivalent to an 80 foot head of water.

The material is packaged in caulking cartridges and can be used in a standard caulking gun. It should have a long shelf life, even when exposed to great variations of temperature ($-20°$ F. to $+130°$ F.). It is designed to be applied by unskilled and untrained labor on almost every use outlined above. It solves current problems in the construction and maintenance industry which are not being solved with current products.

The material is applied to the interior of concrete joints between successive pours. The water of hydration in the west concrete is not sufficient to swell the montmorillonite/adhesive mixture. At a later date, when water attempts to pass through the joint, the montmorillonite swells and extrudes toward the source of water. The bond with the two faces of concrete is waterproof as well as the montmorillonite compound itself. The material will remain expanded so long as sufficient humidity (65%) is present. If the compound dries out, it will re-swell as soon as exposed to the water. This wet-dry cycling can continue an indefinite number of times without affecting the waterproofing ability of the seal.

For troweling or spraying the thickness of the layer applied can be varied to meet existing conditions.

After curing, when the fluidizing agents have evaporated, the material will be 80% to 95% bentonite by weight.

The liquid adhesive agents cannot penetrate the interior of the saturated particles during the shelf-life of the mixture. The hydrocarbon resin molecules cannot penetrate into the small openings of the bentonite particles. The fluidizer evaporates after the material is applied, and as it evaporates, the adhesive agents remain deposited on the bentonite and bind it together. The adhesive tends to be carried by the solvent toward the exposed surface and thus the outer surface of the waterproofing layer will have a higher concentration of the adhesives than the portion of the layer adjacent the wall.

The quantity of adhesive used is maintained at a low enough level so the adhesive coating is not impervious. It has pores or openings even though it will hold the bentonite in place. The adhesive preferably is selected to become tough and elastic. When water is present at the waterproofing layer or bead and starts to move through the pores or openings in the adhesive the bentonite will jell and stop water movement.

While the mixture of bentonite fluidizes and liquid adhesive is homogeneous before application, after the mixture has been applied, particularly if a layer has been troweled on or sprayed onto a wall, the fluidizer starts to evaporate. This evaporating fluidizer tends to carry the adhesive out toward the outer surface of the layer. The adhesive resin thus accumulates near the outer surface and aids in resisting abrasion or mechanical damage which might result from action such as back filling a coated wall. The adhesive usually has pores which will pass water and, of course, any contact between water molecules and the bentonite particles will result in swelling of the bentonite.

Typical commercially available adhesive agents include a preferred resin sold under the mark "WING-TACK 95" by Goodyear Chemicals, the Goodyear Tire and Rubber Company, Arkon, Ohio. This has a softening point of 100° C. and a molecular weight of 1200 and a flash point of 480° F. Another preferred resin is sold under the "PICCOTAC B" resin (BBHT) by Hercules Incorporated, Wilmington, Delaware, 19899. The C resin has a softening point between 96° C. and 103° C. and a flash point of 480° F. Hercules Incorporated PICCOTAC A and C resins and its HECCOTAC LA95BHT will also work. Exxon Chemicals Company makes suitable resins as well, such as Escorez 1310. The resins are totally water insoluble and thus continue to hold the bentonite layer together after being in the presence of water. They also are somewhat tacky or resilient and thus "give" as the bentonite expands.

The composition disclosed keeps the bentonite unexpanded until exposed to free water in use. The material thus does not crack or craze after installation. The components are selected to, in particular, prevent hydration of the bentonite prior to application.

What is claimed is:

1. A coating material for waterproofing constructed structures comprising an initial mixture of sodium montmorillonite bentonite saturated with a fluidizing material selected from the group consisting of liquid aliphatic or alicyclic hydrocarbon compounds, and a non-aqueous adhesive agent not displaceable by water ranging between five to ten percent by weight of the coating material, said non-aqueous adhesive agent causing a bond between the bentonite particles without displacing the liquid fluidizer agent and without penetrating the particles, the coating material comprising between 20 to 25 pounds of fluidizing agent to 100 pounds of bentonite.

2. The composition of claim 1 wherein said sodium montmorillonite is a fine material between 200 and 325 U.S. standard mesh.

3. The composition of claim 1 wherein said adhesive agent is a hydrocarbon resin containing linear, branch and/or cyclic structure of an aliphatic nature.

4. The composition of claim 3 including additional thickening agents including fumed silica and bentones added to achieve a desired consistency to the coating material and wherein the fumed silica adds to abrasion resistance of the coating material.

5. The composition of claim 1 wherein said liquid aliphatic or alicyclic hydrocarbon compound comprises a carbon range between $C_6$ and $C_{16}$.

6. The composition which results from initially mixing approximately 15 pounds of a liquid non-polar aliphatic or alicyclic hydrocarbon fluidizing agent to a 100 pounds of unhydrated montmorillonite to saturate the montmorillonite particles with the fluidizing agent, and subsequently mixing after saturation of the montmorillonite with the fluidizing agent a non-aqueous adhesive agent dissolved in an additional quantity of fluidizing agent to act as a solvent, with the fluidizing-agent-saturated sodium montmorillonite and adding thickening agents to achieve the desired consistency of the resulting mixture.

7. The composition of claim 6 wherein said adhesive agent is a hydrocarbon resin added in the range of five to ten pounds to 100 pounds of sodium montmorillonite, and the additional quantity of fluidizing agent comprises substantially five pounds of such fluidizing agent.

8. A method of mixing a bentonite waterproofing composition for constructed structures comprises the steps of adding in the range of 15 to 20 percent by weight of a liquid non-polar hydrocarbon fluidizing agent to a sufficient quantity of unhydrated fine granular bentonite to saturate the bentonite and mixing the bentonite and fluidizing agent together, subsequently mixing after saturation of the bentonite with the fluidizing agent an adhesive agent comprising a hydrocarbon resin having a softening point between 70° C. and 120° C. liquefied with approximately five percent by weight of said fluidizing agent to form a substantially homogeneous mixture wherein the bentonite particles tend to adhere together from action of the adhesive agent and with the fluidizing agent inhibiting the penetration of the bentonite by the adhesive agent and without displacing the fluidizer from within the bentonite particles, and adding thickeners as desired.

9. The method of mixing a waterproofing composition having a bentonite particle base for constructed structures, the method comprising initially mixing together of a non-polar liquid fluidizer selected from the group consisting of liquid aliphatic or alicyclic hydrocarbon compounds with particulate bentonite of between 200 and 325 U.S. standard mesh until the bentonite particles are saturated with the liquid fluidizer, and mixed at a rate of approximately 15 pounds of the liquid fluidizer to 100 pounds of bentonite, adding after saturation of the bentonite particles with the fluidizing agent a further mixture of between five to ten pounds of a non-aqueous adhesive material having the properties of isobutylene, up to one pound of a plasticizer, and five to ten additional pounds of the liquid fluidizer with the fluidizing agent inhibiting penetration of the bentonite by the adhesive agent, and after thoroughly mixing adding suitable thickening agents to reach a desired consistency, said thickening agents being selected from fumed silica for added abrasion resistance and bentones.

10. The method of claim 9 including the further step of utilizing a paddle type low shear mixer and mixing the material in the range of 14 to 20 minutes per batch.

* * * * *